United States Patent Office 3,388,897
Patented June 18, 1968

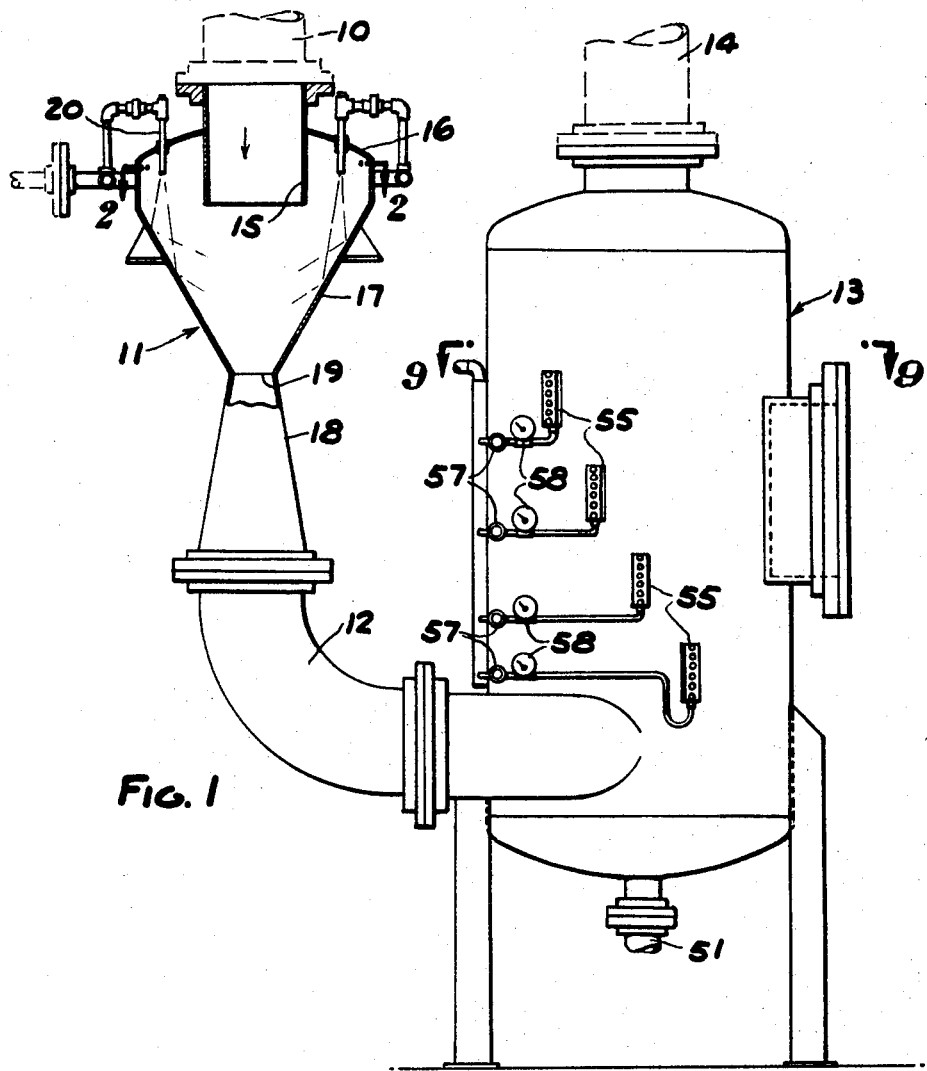
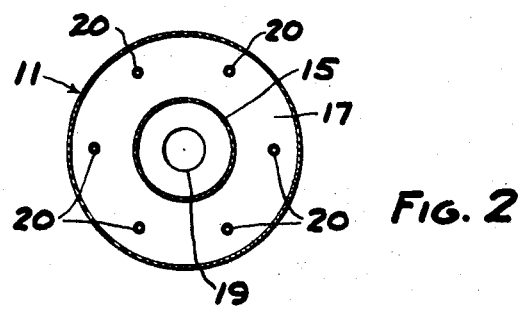

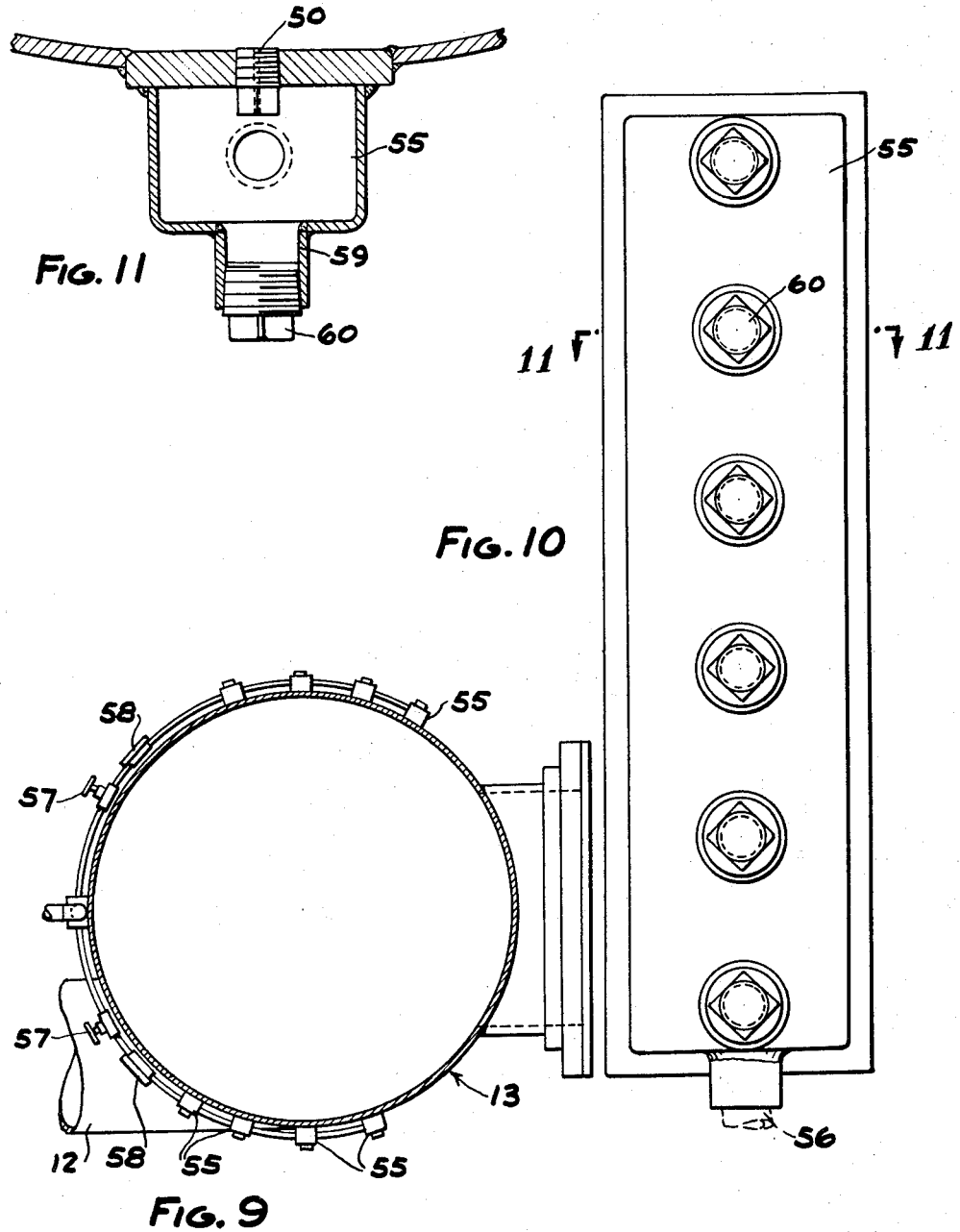

3,388,897
APPARATUS FOR SEPARATING AND COLLECTING PARTICLES CARRIED BY GASES
Ralph R. Calaceto, Ridgewood, N.J., assignor to Automotive Rubber Co., Inc., Detroit, Mich., a corporation of Michigan
Continuation of application Ser. No. 776,797, Nov. 28, 1958. This application Jan. 25, 1963, Ser. No. 254,014
3 Claims. (Cl. 261—111)

This application is a continuation of application Ser. No. 776,797, filed Nov. 28, 1958, titled, Gas Treatment Apparatus, and now abandoned.

This invention relates to apparatus for treating gases and particularly for separating and collecting particles carried by gases.

In the treatment of gases, it has been suggested that separation of the particles from the gases can be achieved by impinging jets of liquid such as water into contact with the gases.

It is an object of this invention to provide an apparatus wherein a more efficient separation of particles of both micron and submicron size is achieved by utilizing jets of liquid such as water.

In the drawings:

FIG. 1 is a part sectional elevation of an apparatus embodying the invention.

FIG. 2 is a fragmentary sectional view taken along the line 2—2 in FIG. 1.

FIG. 9 is a sectional view taken along the line 9—9 in FIG. 1 showing another arrangement of nozzle assemblies.

FIG. 10 is a side elevational view of one of the nozzle assemblies shown in FIG. 9.

FIG. 11 is a fragmentary sectional view taken along the line 11—11 in FIG. 10.

Figure 3:
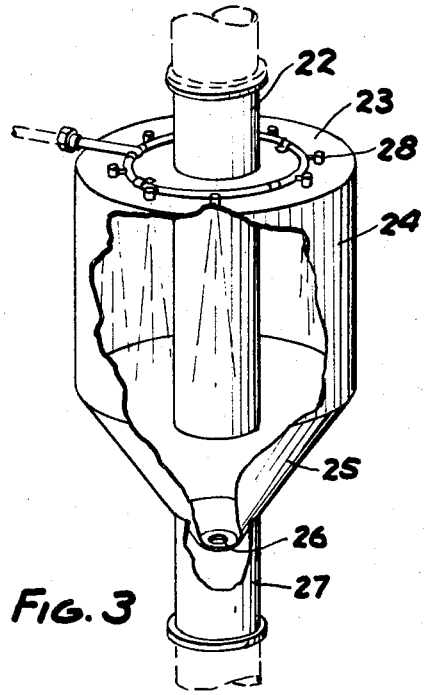
FIG. 3 is a fragmentary perspective view of a modified form of the invention.

Referring to FIG. 1, gas which is to be treated is introduced through an inlet pipe 10 to impact type scrubber 11 and then passes through a connecting pipe 12 to a cyclonic type scrubber 13. The particles in the gas which are of micron or submicron size are agglomerated in impact scrubber 11. The agglomerated particles pass to the cyclonic scrubber 13 where they are separated from the gases. Small agglomerates which may be one or two microns in size may be further agglomerated by the action of the liquid in the cyclonic scrubber 13 and are separated from the gases. Otherwise, the particles which are one or two microns in size may be discharged with the gases.

As shown in FIG. 1, impact scrubber 11 comprises an open ended cylindrical thimble 15 which is surrounded by a dome section 16. Scrubber 11 also includes an inverted frusto-conical section 17 which converges downwardly from the periphery of the dome section 16 from a point adjacent the lower end of thimble 15 and a diverging section 18 extending downwardly from the lower end of the frusto-conical section 17 thereby forming a throat 19.

Means are provided for introducing a plurality of jets of water into impactor 11 and comprise a plurality of nozzles 20 circumferentially spaced in dome 16 with their axes parallel to the axis of thimble 15. By this arrangement the gases are cooled in the area of the thimble 15 by indirect contact or conduction through the thimble wall. As a result, in the area of the thimble wall the cooling of the gases is performed in a sensible manner. As the water moves below the lower end of the thimble, it comes in direct and intimate contact with the hot gases thereby causing further cooling of the gases by adiabatic saturation.

As the gases approach the throat 19, their velocity is increased. Increased velocity in the area of contact with the liquid at the throat 19 is sufficiently great to agglomerate the submicron particles in the gases.

Although I do not wish to be bound by the theory involved, in my opinion, the very desirable results of agglomeration of the submicron particles in my invention are achieved by the interaction of the liquid and the gases at the throat 19. The liquid from the nozzles 20 travels downwardly along the converging wall 17 of the impact scrubber 11 and tends to close or restrict the throat 19. The gases containing the particles which are to be removed move downwardly and as they approach the throat 19 their velocity is substantially increased. The gases moving at high velocity atomize the liquid at the throat 19 into droplets which are of sufficiently fine size that they will collide with the particles in the gases and wet these particles so that they will readily agglomerate.

The novel cooling action of the impact scrubber provides for a saturation of the gas at a lower temperature. If the liquid emanating in the jets 20 contacted the hot gases directly then a higher adiabatic saturation temperature would result. This may be readily understood by referring to psychrometric tables. For example, referring to such tables shows the following:

(A) Gas at 1800° F. has a humidity of 0.14 pound of moisture per pound of dry gas. Upon adiabatic saturation the gas cools to 180° F. with a humidity of 0.657 pound of moisture per pound of dry gas.

(B) Gas at 1800° F. cooled sensibly to 600° F. will maintain a humidity of 0.14 pound of moisture per pound of dry gas. Upon adiabatic saturation, the temperature is reduced to 158° F. with a humidity of .278 pound of moisture per pound of dry gas.

It can be seen that under condition A above approximately 50 percent of the total gaseous volume comprises water vapor. This may be contrasted to condition B wherein the gas is initially cooled to 600° F. and the resultant water vapors comprises 30 percent of the total gaseous volume.

It can thus be seen that the impact scrubber 11 may be used not only to efficiently agglomerate the submicron sized particles in the gases but in addition to cool gases so that they leave the impact scrubber 11 at a lower saturation temperature.

The impact scrubber 11 may also be used as a reactor in chemical processes where it is desired to bring a liquid and a gas into intimate contact.

Although the thimble 15, sections 16, 17 and 18 are shown as being circular in cross section, it will be appreciated that the cross section of these sections may be changed as long as the relationship and relative sizes of the sections are retained.

A modified form of impact scrubber is shown in FIG. 3 and includes a generally cylindrical thimble 22 which introduces the hot gases into a housing comprising a flat horizontal top wall 23, vertical cylindrical side wall 24 and an inverted frusto-conical bottom wall 25 having a restricted opening 26 in the lower end thereof which communicates with a cylindrical pipe 27 of larger diameter than the opening 26. The lower end of thimble 22 terminates adjacent the lower end of the vertical wall 24. A plurality of circumferentially spaced nozzles 28 project through the top wall 23 with their axes parallel to the axis of thimble 22 so that they direct jets of water downwardly into the housing.

In this form of impact scrubber, as in the form shown in FIG. 1, in addition to agglomeration of particles carried by the gas of submicron size or larger, a sensible cooling of the hot gases occurs by indirect contact or conduction through the thimble wall 22 and thereafter an adiabatic saturation cooling occurs in the portion of the housing below the lower end of thimble 22.

Figure 4:
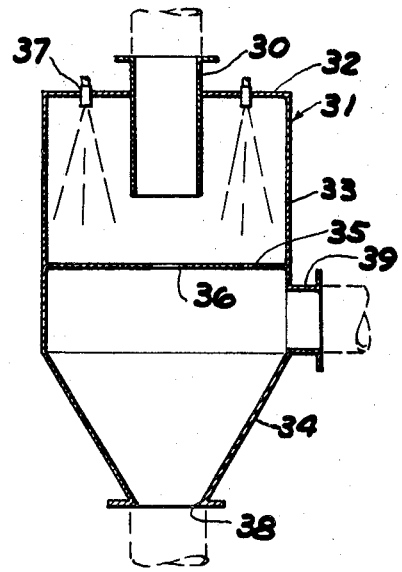
FIG. 4 is a sectional elevation of another modification of the invention.

A further modified form of impact scrubber is shown in FIG. 4 and comprises a short cylindrical thimble 30 through which the hot gases are directed downwardly into a housing 31 which includes a top wall 32, cylindrical side wall 33 and frusto-conical lower section 34. Housing 31 also includes an intermediate horizontal wall 35 having a central opening 36 therein and positioned below the lower end of the thimble 30 which in turn terminates intermediate the top wall 32 and bottom wall 35.

A plurality of circumferentially spaced nozzles 37 having their axes parallel to the axis of thimble 30 direct a plurality of jets of water downwardly so that there is an agglomeration of particles of submicron size or larger carried by the gases. In addition, sensible cooling of the hot gases through the wall of thimble 30 and an adiabatic cooling below the lower end of the thimble 30 by direct and intimate contact of the water and the hot gases. In the form shown in FIG. 4, there is a lower outlet 38 or restricted opening at the lower end of section 34 through which the liquid in the entrained particles pass and a side outlet 39 adjacent and below wall 35 through which the gases pass.

Figure 5:
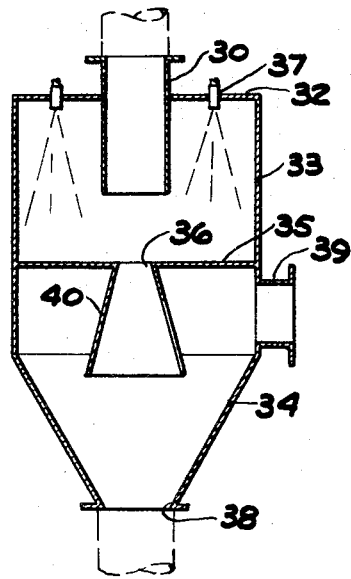
FIG. 5 is a sectional elevation of a further modified form of the invention.

A still further form of the impact scrubber is shown in FIG. 5 and is identical to that shown in FIG. 4 except that a frusto-conical flared wall 40 extends downwardly from the opening 36 in plate 35.

Figure 6:
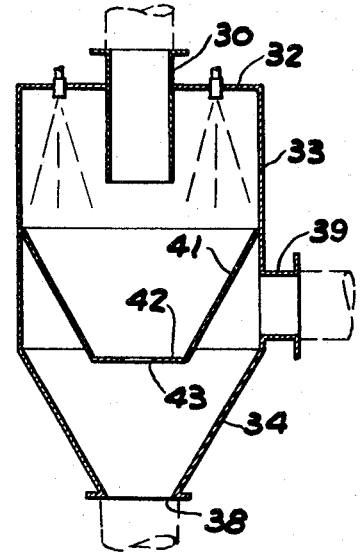
FIG. 6 is a sectional elevation of another modified form of the invention.

The form of impact scrubber shown in FIG. 6 is similar to that in FIGS. 4 and 5 except that the intermediate wall comprises an inverted frusto-conical portion 41 and a central flat portion 42 having an opening 43 therein.

Figure 7:
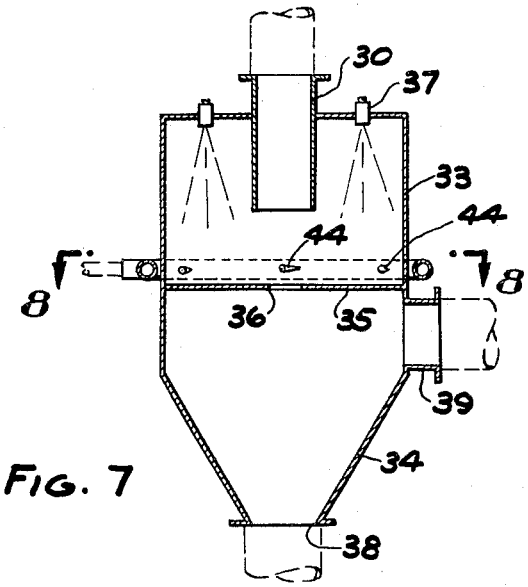
FIG. 7 is a sectional elevation of another modified form of the invention.
Figure 8:
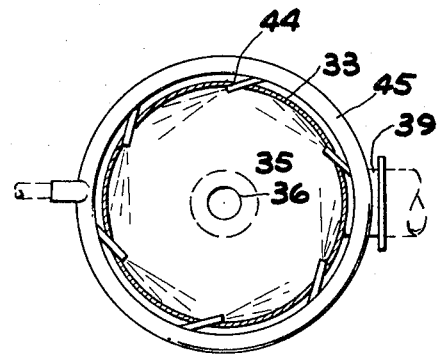
FIG. 8 is a sectional view taken along the line 8—8 in FIG. 7.

The form of impact scrubber shown in FIG. 7 is similar to that shown in FIG. 4 but in addition includes a second set of nozzles 44 extending inwardly from a ring 45 around the periphery of wall 33 above wall 35 and having their axes generally tangential to the inner surface of wall 33 so that liquid such as water is directed in a rotary fashion around the inner surface of the wall 33 above plate 35. This provides an additional cooling of the gases.

In all of the forms of impact scrubber shown in FIGS. 1 through 8, a restriction is provided below the thimble and adjacent to the enlarged area at the lower end of the thimble to increase the velocity of movement of the gases through the apparatus.

Gas after having been treated in impact scrubbers may be treated in any conventional liquid-gas separator to remove the agglomerated particles and liquid from the gases or may be further treated in the cyclonic scrubber 13. When the gases are treated in a cyclonic scrubber 13, they are caused to enter the scrubber in a tangential direction at one end thereof and to move longitudinally thereof in a spiral fashion. As the gases move along the scrubber 13, they are subjected to a plurality of generally radially extending jets from nozzles 50 which are spaced circumferentially and vertically along the wall of scrubber 13. Agglomerated particles from the impact scrubber 11 which are of one or two micron size are easily agglomerated in cyclonic scrubber 13 to a size where they are readily separated in the cyclonic scrubber 13. The gases pass out through the top opening 14 and the liquid which is separated passes out through the bottom opening 51.

The impact scrubbers shown in FIGS. 1 through 8 may be used in the treatment of gases in various manners.

The impact scrubbers may also be used as de-dusters to remove particles which are carried by the gases. These particles may comprise metallurgical or nonmetallic materials. When used as a de-duster, the apparatus eliminates the accumulation or caking of sludge in the area of contact of the liquid with the gas. Although I do not wish to be bound by the theory involved, in my opinion, the beneficial results achieved in the retardation of sludge such as might occur by contact of hot gases with liquid at a lower temperature is achieved because the liquid moving along the converging wall 17 tends to lubricate the wall and prevent the accumulation of sludge along the wall.

The impact scrubbers 11 are most effectively used as agglomerators for coalescing the submicron particles in the gases into larger sizes so that they can be readily separated from the gases. Accordingly, the outlet of the diverging section 18 of impact scrubber 11 may be connected to a separator of conventional construction.

The impact scrubbers 11 thus may be used independently of the cyclonic scrubbers 13.

Cyclonic scrubbers 13 are used to cool the gases and in addition may be used independently to agglomerate and remove particles of micron size or larger from gases. Cyclonic scrubbers 13 are of generally conventional construction except for the specific arrangement of the nozzles 50. As shown in FIGS. 9, 10 and 11, the nozzles 50 are provided in vertical banks at circumferentially spaced points along the periphery of the jet scrubber 13. The nozzles communicate with the header 55 to which water or other liquid is supplied through supply pipes 56. A valve 57 is provided in each supply pipe 56, as is a pressure gauge 58 (FIG. 1). Access openings 59 are provided in axially aligned relationship to each nozzle 50. Each opening 59 is closed by a removable plug 60.

By this arrangement, if for any reason a nozzle 50 becomes plugged, the plugging will be registered by an increase in pressure on one of the gauges 58. The operator may then close the corresponding valve 57, remove the plugs 69 and clean the nozzles 50 in the particular header 55 without interrupting the operation of the jet scrubber 13. This arrangement thus permits the jet scrubber to be operated and maintained without interrupting its function in any material degree.

The principal function of the cyclonic scrubber 13 is to handle the more common de-dusting problems where gases carry micron size particles.

I claim:

1. In a gas treating apparatus, the combination comprising a housing having a flat top portion and a vertical cylindrical side wall extending downwardly from the periphery of the flat top portion, gas inlet means comprising a vertical tubular thimble extending vertically through the top wall portion into the housing, the lower end of said thimble terminating in spaced relation to the upper end of said side wall, said housing including a frustoconical section extending downwardly from the lower end of said side wall and having a restricted opening at the lower end thereof, said housing including a horizontal transverse plate intermediate the top and bottom of said side wall, said plate being imperforate except for an opening therein aligned with the axis of said thimble, a plurality of nozzles in said top portion between said thimble and said side wall and spaced therefrom for directing a plurality of jets of liquid downwardly into the space between the side wall and the thimble onto said transverse plate, said nozzles being spaced circumferentially about said top portion, the lower end of said side wall extending downwardly below said transverse plate, said restricted opening being aligned with the axis of the thimble and the opening in said plate and forming a discharge outlet for liquid, said housing including an outlet opening for gas positioned in said side wall at a level below said plate and above said opening in said frustoconical section, a conduit extending laterally from said gas outlet opening, a second set of nozzles mounted in the side wall of said housing above said plate and spaced around the periphery of said housing and said second set of nozzles having their axes extending tangentially of the side wall of the housing for directing liquid in a rotary fashion around the inner surface of the side wall above said plate.

2. In a gas treating apparatus, the combination comprising a housing having a flat top portion and a vertical cylindrical side wall extending downwardly from the periphery of the flat top portion, gas inlet means comprising a vertical tubular thimble extending vertically through the top wall portion into the housing, the lower end of said thimble terminating in spaced relation to the upper end of said side wall, said housing including a frustoconical section extending downwardly from the lower end of said side wall and having a restricted opening at the lower end thereof, said housing including a horizontal transverse plate intermediate the top and bottom of said side wall, said plate being imperforate except for an opening therein aligned with the axis of said thimble, a plurality of nozzles in said top portion between said thimble and said side wall and spaced therefrom for directing a plurality of jets of liquid downwardly into the space between the side wall and the thimble onto said transverse plate, said nozzles being spaced circumferentially about said top portion, the lower end of said side wall extending downwardly below said transverse plate, said restricted opening being aligned with the axis of the thimble and the opening in said plate and forming a discharge outlet for liquid, said housing including an outlet opening for gas positioned in said side wall at a level below said plate and above said opening in said frusto-conical section, a conduit extending laterally from said gas outlet opening, and a frusto-conical flared wall extending downwardly and outwardly from the opening in said plate and terminating in the frusto-conical section.

3. In a gas treating apparatus, the combination comprising a housing having a flat top portion and a vertical cylindrical side wall extending downwardly from the periphery of the flat top portion, gas inlet means comprising a vertical tubular thimble extending vertically through the top wall portion into the housing, the lower end of said thimble terminating in spaced relation to the upper end of said side wall, said housing including a frusto-conical section extending downwardly from the lower end of said side wall and having a restricted opening at the lower end thereof, said housing including a horizontal transverse plate, said plate being imperforate except for an opening therein aligned with the axis of said thimble, a plurality of nozzles in said top portion between said thimble and said side wall and spaced therefrom for directing a plurality of jets of liquid downwardly into the space between the side wall and the thimble onto said transverse plate, said nozzles being spaced circumferentially about said top portion, said restricted opening being aligned with the axis of the thimble and the opening in said plate and forming a discharge outlet for liquid, said housing including an outlet opening for gas positioned in said side wall at a level below said thimble and above said opening in said frusto-conical section, a conduit extending laterally from said gas outlet opening, an inverted frusto-conical portion connected to the side wall of the housing at a level above said gas outlet opening and below said thimble and terminating in said frusto-conical section and said transverse plate being positioned in the restricted end of said inverted frusto-conical portion.

References Cited
UNITED STATES PATENTS

| | | | |
|---|---|---|---|
| 594,480 | 11/1897 | Leibert | 261—115 |
| 1,388,813 | 8/1921 | Geesman | 261—111 |
| 1,787,790 | 1/1931 | Mastenbrook | 261—116 |
| 2,090,994 | 8/1937 | Brandes | 261—116 X |
| 2,684,836 | 7/1954 | Arborgh et al. | |
| 2,689,715 | 7/1954 | Ericson | 261—111 |
| 2,883,167 | 4/1959 | Krantz | 261—16 |
| 3,009,687 | 11/1961 | Hendriks | 261—118 X |

RONALD R. WEAVER, *Primary Examiner.*

HARRY B. THORNTON, *Examiner.*